United States Patent [19]

Aoi et al.

[11] Patent Number: 4,958,984
[45] Date of Patent: Sep. 25, 1990

[54] FUEL PUMP HAVING IMPROVED SHAFT/IMPELLER COUPLING

[75] Inventors: Tomio Aoi; Toshihiro Kameda, both of Saitama, Japan

[73] Assignee: Honda Giken Kogyo Kabushiki Kaisha, Tokyo, Japan

[21] Appl. No.: 349,184

[22] Filed: May 8, 1989

[30] Foreign Application Priority Data

May 25, 1988 [JP] Japan .......................... 63-68956[U]

[51] Int. Cl.$^5$ .................. F04D 29/18; F04D 29/20
[52] U.S. Cl. .................. 415/55.1; 416/204 R; 416/204 A; 403/355
[58] Field of Search ............ 415/55.1; 416/204 R, 416/204 A, 223 R, 223 A, 244 R, 244 A, 244 C, 212 A, 212 R; 403/355, 356, 364, 340

[56] References Cited

U.S. PATENT DOCUMENTS

| | | | |
|---|---|---|---|
| 483,394 | 9/1892 | Seelye | 415/157 |
| 1,768,243 | 6/1930 | Ferguson | 415/55.1 |
| 1,840,148 | 1/1932 | Berry | 416/212 R |
| 2,269,429 | 1/1942 | Brenkert | 403/355 |
| 2,614,501 | 10/1952 | Baker | 416/223 R |
| 3,111,904 | 11/1963 | Burns | 415/55.1 |
| 3,233,551 | 2/1966 | Oshima | 415/55.1 |
| 3,947,149 | 3/1976 | Macmanus | 415/55.4 |
| 4,715,777 | 12/1987 | Tuckey | 415/55.1 |

FOREIGN PATENT DOCUMENTS 0000595  1/1984  Japan .................. 416/204 R

*Primary Examiner*—Robert E. Garrett
*Assistant Examiner*—Hoang Nguyen
*Attorney, Agent, or Firm*—Pollock, Vande Sande and Priddy

[57] ABSTRACT

A circular hole through which a main shaft of a fuel pump is inserted is defined at the central portion of an impeller, one or plural pin holes are so defined around the circular hole that the centroidal position is not deviated from the rotational central axis, a first engaging portion is formed at an end of the main shaft to be inserted into the impeller, and a coupler provided with a second engaging portion which engages with the first engaging portion and a pin or pins to be inserted into the pin holes is used to secure the impeller to the main shaft. These members are so arranged that the impeller and the coupler are located respectively in point or line symmetry with respect to the rotational central axis of the armature in the pump or the main shaft, i.e. the respective centers of gravity of the main shaft, impeller and coupler are positioned on the rotational central axis of the armature in the pump so that the armature keeps its balance.

7 Claims, 5 Drawing Sheets

FUEL PUMP HAVING IMPROVED SHAFT/IMPELLER COUPLING

BACKGROUND OF THE INVENTION

1. Field of the Invention

The present invention relates to a fuel pump, and more particularly to a fuel pump which can be easily balanced and in which there is neither pulsation on the fuel delivered nor production of noise relating thereto.

2. Description of the Prior Art

FIG. 5 is a vertical sectional view showing a conventional Westco type fuel pump placed on the fuel passage of an internal combustion engine wherein a core 4 is fixed on a main shaft 1 functioning as the axis of rotation of an armature of the fuel pump, and a coil 5 is wound around and attached to the core 4. Insulation of the core 4 with respect to the coil 5 is made by applying a powder baking finish to the core 4.

After mounting forcibly the main shaft 1 by sleeves 20A and 20B, the coil 5 is molded by the use of a resin. The sleeves 20A and 20B are disposed so that the main shaft 1 stably supports the coil 5, and further the sleeve 20A is disposed so as to favorably carry the armature in the thrust direction.

A commutator 6 is further mounted on the main shaft 1. The opposite ends of the main shaft 1 are rotatably supported by means of bearings 2 and 3 within a body or casing of the fuel pump.

Reference numerals 7, 8, 21 and 24 designate a brush, a magnet, a washer for a thrust pad of the armature, and a terminal for electric power, respectively.

An impeller 9 is a disk-shaped member having a plurality of grooves 9A defined on the opposite side of the circumferential part thereof. FIG. 7 is a plan view showing the impeller 9. Furthermore, FIG. 6 is an enlarged view showing the impeller 9 and the vicinity thereof in FIG. 5.

One end of the main shaft 1 is machined to define a stepped portion indicated by reference character 1A, and in addition a hole having substantially the same profile as that of said end in its section (a fitting hole having a partially cutout circular profile designated by reference character 9C in FIG. 7) is defined at the central portion of the impeller 9. The stepped portion of the main shaft 1 is inserted into the hole 9C of the impeller 9 so that the impeller 9 is attached and secured to the main shaft 1.

The circumferential portion of the impeller 9 protrudes into a pump chamber 10 shown in FIG. 5.

Meanwhile, when a current is supplied through the terminal 24 to energize the armature of the fuel pump thereby rotating the impeller 9 in a prescribed direction, fuel is sucked through an inlet 13 (in the direction of arrow A). The fuel is passed through the pump chamber 10, internal chambers 11 and 12 of the fuel pump, and discharged from an outlet 14 (along the direction of arrow B).

In order to raise the efficiency of the fuel pump, it is necessary to make a clearance defined by the impeller 9 and each contact face of a pump housing 22 and a pump cover 23 as narrow as possible, and hence it is required to precisely process these contact faces.

In the present example, the impeller 9 is so constructed that the area which must be processed precisely in the surfaces of the impeller 9 is reduced by defining grooves 9B in the area thereof other than each contact area facing against the surfaces of the pump housing 22 or the pump cover 23.

Such a fuel pump as described above has been disclosed, for example, in Japanese Utility Model Laid Open Publication No. 10313/1958.

As mentioned above, in a conventional fuel pump, a stepped portion as indicated by reference character 1A is defined on the one end of the main shaft 1 by means of cutting work, while the fitting hole 9C of a partially cutout circular profile having substantially the same profile in section as that of said end is defined at the central portion of the impeller 9, and the stepped portion 1A of the main shaft 1 is then inserted into the hole 9C of the impeller 9 so that said impeller 9 is mounted on the main shaft 1.

In such construction as described above, however, since the fitting hole 9C defined on the impeller 9 has a partially cutout circular profile, the center of balance in the impeller 9 deviates from the central axis thereof.

Likewise since the stepped portion 1A is defined on the end of the main shaft 1 by cutting the shaft, the center of balance in the main shaft 1 deviates also from the central axis thereof. Accordingly, in a fuel pump involving such a main shaft 1 and impeller 9, it is required to adjust the balance of the armature as a result the fabrication and assembly thereof are troublesome.

Furthermore, the fitting hole 9C of partially cutout circular profile defined on the impeller 9 cannot be worked after molding the impeller 9. Thus, the fitting hole is defined in general at the time of molding the impeller 9. As a result, the central position of the fitting hole 9C cannot be defined with sufficiently high precision. Therefore, it is substantially impossible to make the central axis of the impeller 9 coincident with that of the main shaft 1. In other words, there are many cases where the impeller 9 is eccentrically attached to the main shaft 1. Thus, it is substantially impossible to attain the above-mentioned perfect adjustment in balance.

Consequently, there are instances where pulsation appears in the flow of fuel discharged from the fuel pump or noise is produced.

SUMMARY OF THE INVENTION

An object of the present invention is to provide a fuel pump in which there is neither pulsation in the flow of fuel, nor production of noise.

Another object of the invention is to provide a fuel pump in which a stepped portion is not defined on its main shaft and a fitting hole of a partially cutout circular profile is not defined also on its impeller, but the impeller can be mounted on the main shaft in coaxial relation.

The present invention is characterized in that a circular main shaft hole through which a main shaft of a fuel pump is to be inserted is defined at the central portion of an impeller, one or plural pin holes are defined around the circular hole in such manner that the centroidal position is not deviated from the rotational central axis, e.g. the pin holes are defined at symmetrical positions with respect to the central axis, a first engaging portion is formed at an end of the main shaft to be inserted into the impeller, and a coupler provided with a second engaging portion which engages with the first engaging portion and a pin or pins to be inserted into the pin holes is used to secure said impeller and main shaft.

When these members are so arranged that the impeller and the coupler are located respectively in point or line symmetry with respect to the rotational central axis of the armature or the main shaft, i.e. when the respective centers of gravity of the main shaft, impeller and coupler are positioned on the rotational central axis of the armature, said armature keeps its balance.

DETAILED DESCRIPTION OF THE INVENTION

Figure 1:
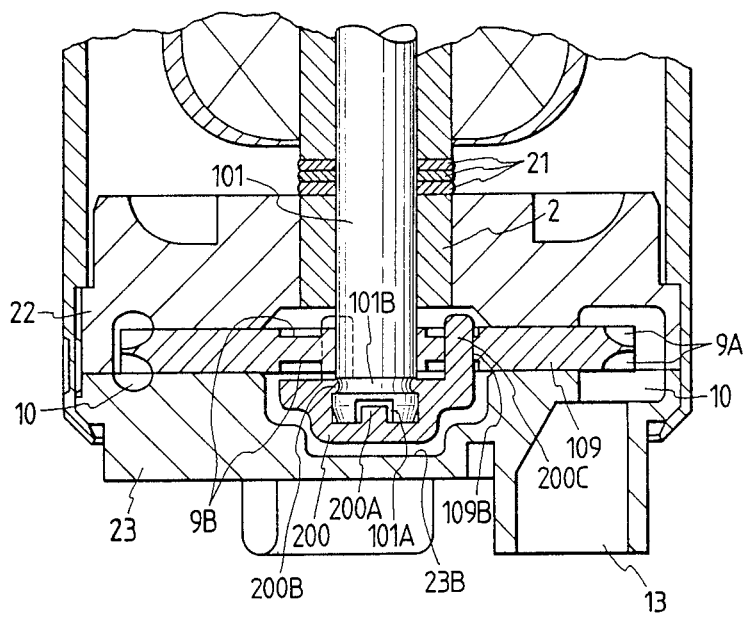
FIG. 1 is an enlarged vertical sectional view showing an example of the impeller and the vicinity thereof according to the present invention.
Figure 2:
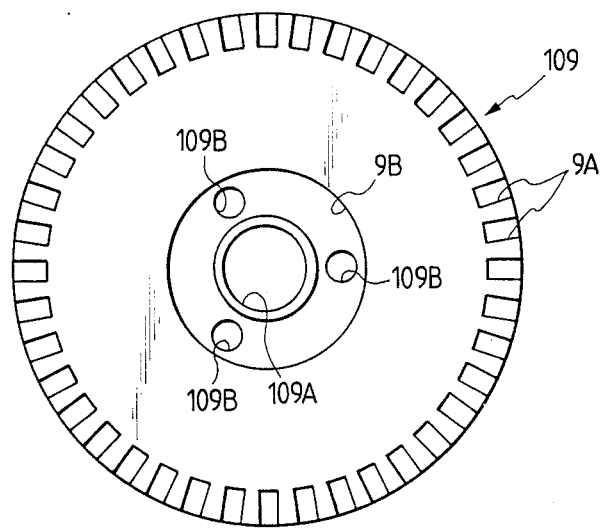
FIG. 2 is a plan view showing an impeller to be applied to the example of the present invention.
Figure 3:
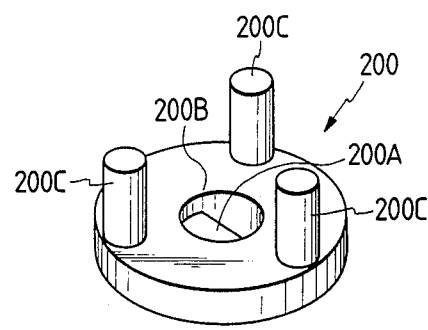
FIG. 3 is a perspective view showing a coupler to be applied to the example of the present invention.
Figure 6:
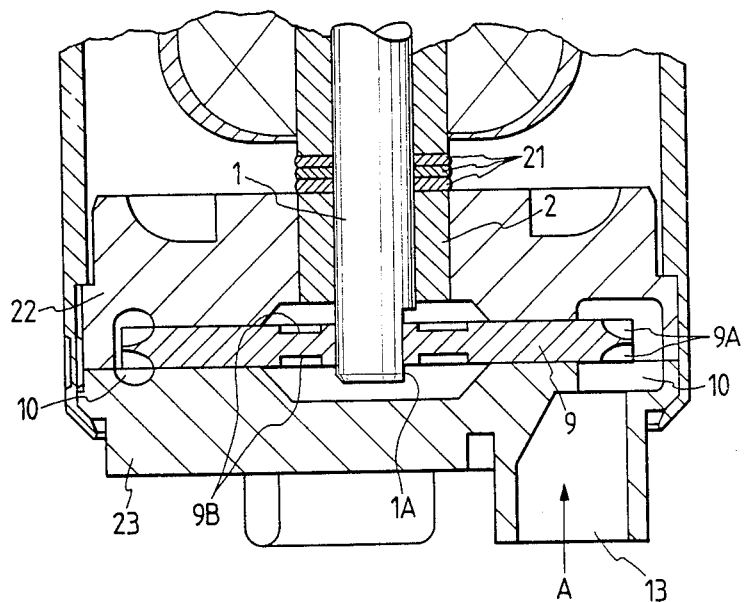
FIG. 6 is an enlarged vertical sectional view showing its impeller and the vicinity thereof in a conventional fuel pump.
Figure 7:
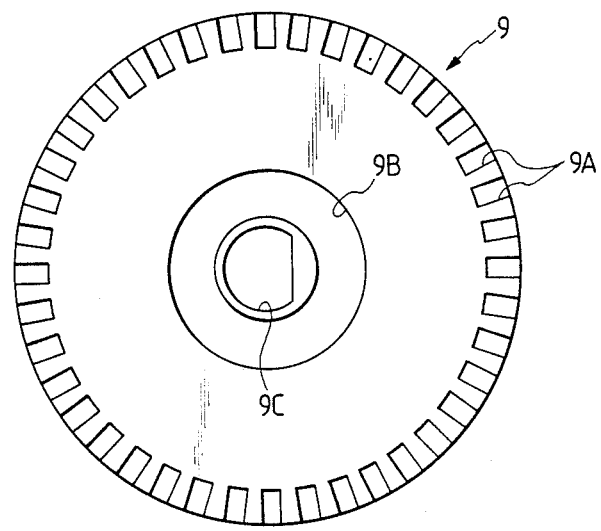
FIG. 7 is a plan view showing an impeller applied to a conventional fuel pump.

The present invention will be described in more detail hereinbelow by referring to the accompanying drawings wherein FIG. 1 is an enlarged vertical sectional view showing an impeller 109 according to an example of the present invention as well as the vicinity of the impeller 109, and this view is the same as that of FIG. 6. Further, FIG. 2 is a plan view showing the impeller 109 to be applied to the example of the present invention, and FIG. 3 is a perspective view showing a coupler 200 to be applied to the example of the present invention. In FIGS. 1 and 2, the same reference characters as those of FIGS. 6 and 7 designate the same or equivalent parts thereof so that the explanation therefor will be omitted.

In FIG. 1, a first groove 101A is defined on the surface of an end of a main shaft 101 which functions as the axis of rotation of an armature and to the end of which is to be attached an impeller. Moreover a second groove 101B is defined on the periphery of the main shaft 101 in the vicinity of said end. The first and second grooves 101A and 101B can be provided with comparatively high precision, and they are symmetrical (point symmetry, line symmetry or rotation symmetry) with respect to the central axis of the main shaft 101. Accordingly, there is no fear that the center of balance in the main shaft 101 deviates from the rotational central axis thereof because of the provision of the grooves 101A and 101B.

In the central portion of the impeller 109, a circular main shaft hole 109A having substantially the same profile as that of the end surface of the main shaft 101 in its section is defined as shown in FIG. 2.

A plurality of pin holes 109B are bored around the main shaft hole 109A in such manner that they are at symmetrical positions with respect to the center of the main shaft hole 109A, in other words, e.g. the pin holes are located at positions where each distance from the center of the hole 109A is equal, the distances between the pin holes also being equal to each other. In FIG. 2, three pin holes 109B are defined, and these pin holes 109B are provided for receiving pins 200C formed on the coupler 200 as mentioned hereinbelow.

The coupler 200 is molded in a dish-form from a resilient material such as a resin or the like and, as shown in FIGS. 1 and 3, is provided with a main body formed so as to cover the end of the main shaft 101, a first rectangular projection 200A (e.g. see FIG. 4) which is formed on the bottom wall of the main body and engages with the first groove 101A, a second projection 200B which projects internally from the inner wall surface of the main body and fits into the second groove 101B, and the pins 200C set out on the upper surface of the main body so as to be insertable into the pin holes 109B of the impeller 109, respectively. As is apparent, the impeller 109 as well as the coupler 200 are each symmetrical with respect to the central axis thereof.

The impeller 109 is mounted on the main shaft 101 by inserting the end of the main shaft 101 into the main shaft hole 109A of the impeller 109, and the second projection 200B of the coupler 200 is fitted to the second groove 101B of said end. The fitting operation may be carried out in such a manner that the first projection 200A of the coupler 200 is engaged with and inserted into the first groove 101A of the main shaft 101 and the pins 200C of the coupler 200 are engaged with and inserted into the pin holes 109B of the impeller 109, respectively, and then the coupler 200 is forced in towards the end of the main shaft 101 so as to expand the second projection 200B.

When fitting the parts together as described above, since it is required to expand the second projection 200B while inserting the pins 200C into the pin holes 109B, there are instances where said fitting operation becomes troublesome as a result of the type of material from which the coupler 200 is manufactured, the size thereof or a like factor.

Figure 4:
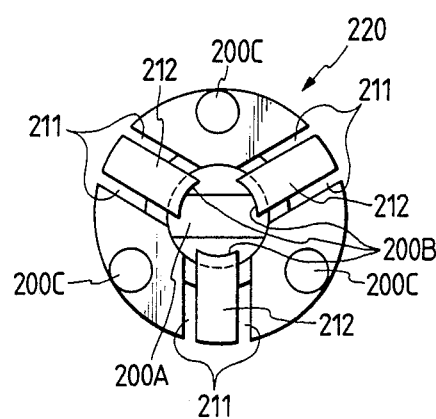
FIG. 4 is a plan view showing another example of the coupler.

To minimize such problems, the coupler may be the one having the construction shown in FIG. 4 in order to effect more easily the fitting operation described above.

FIG. 4 is a plan view showing an example of the alternative coupler 220 in which the same reference characters as those of FIG. 3 designate the same or equivalent parts thereof.

As is clear from the comparison with that of FIG. 3, coupler 220 is modified by providing grooves 211 on the upper surface of the coupler shown in FIG. 3, and second projections 200B are formed to project internally from the inner wall surface of the main body on only such portions 212 where no pin 200C is set up over the surface of the main body of the coupler 220 divided by the grooves 211.

In case of mounting the coupler 220 on the main shaft 101 and the impeller 109 (shown in FIG. 1), it is sufficient to curve and expand only the portions indicated by reference numerals 212 in the coupler 220, so that the fitting operation therefor becomes very easy.

In the above-mentioned explanation, while the annular second groove 101B is defined in the vicinity of an end of the main shaft 101 and the second projection 200B fitting into the second groove 101B is formed on the coupler 200 or 220, said second groove 101B as well as second projection 200B are not necessary if the members are so arranged that the first projection 200A is not disengaged from the first groove 101A and the pins 200C are not disengaged from the pin holes 109B by the use of a suitable means in which the coupler 200 (or 220) is caused to abut upon a concave 23B defined on a pump cover 23 or the like means. In this case, the couplers 200 or 220 may be made from an inelastic material.

While three pin holes 109B have been defined on the impeller 109 as well as three pins 200C have been formed on the coupler 200 (or 220), as a matter of course, two, four or more pins and pin holes may be provided. In the case where four pin holes 109B and pins 200C are provided, they may be disposed in a quadrilateral arrangement obtained by connecting the respective centers of these four pin holes or pins, respectively, to form a rectangle or rhombus, with the center of the rectangle or rhombus being coincident with the center of rotation of the impeller 109.

Generally speaking, the shapes, constructions and positions of the respective holes 109B, pins 200C, and the projection 200A may be determined in such manner that the respective centers of gravity in the impeller 109 and the coupler 200 are positioned on the rotational central axis of the main shaft 101 after completing the assembly thereof.

While the annular groove 9B has been defined around the center hole 109A of the impeller 109 in FIGS. 1 and 2, the groove 9B is not always necessarily provided.

Figure 5:
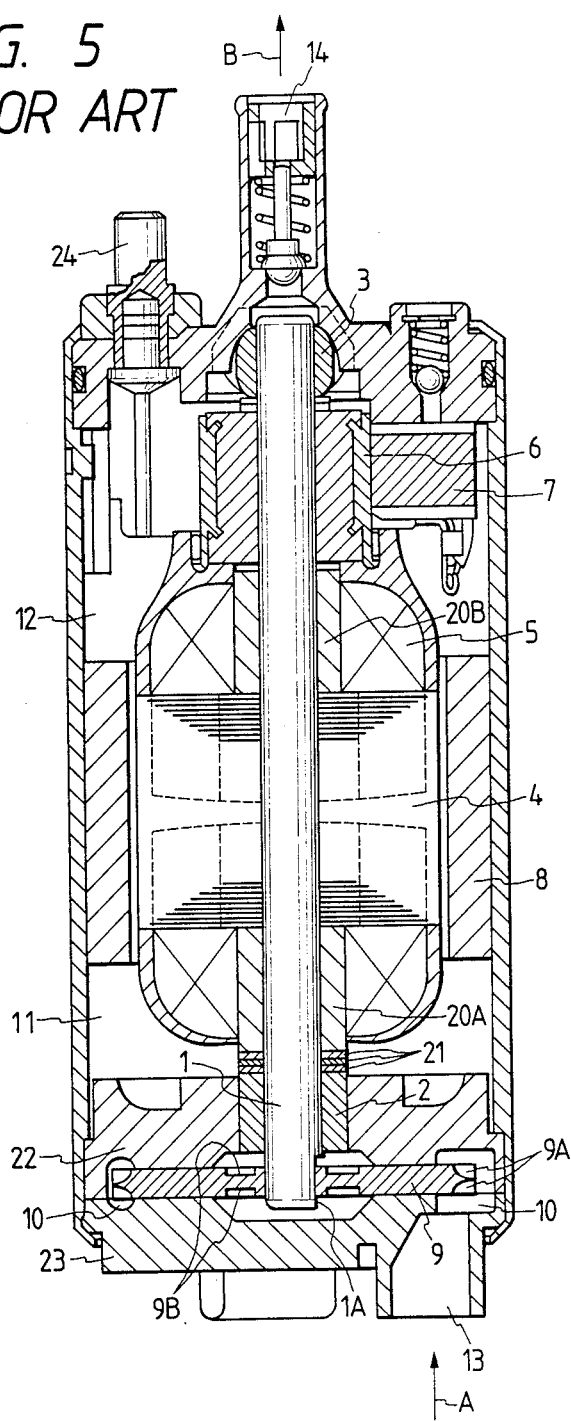
FIG. 5 is a vertical sectional view showing a conventional Westco type fuel pump disposed in a fuel passage of an internal combustion engine.

In the present invention, a construction other than the main shaft, an attached portion of the impeller and the coupler may be, as a matter of course, any construction such as that shown in FIG. 5 or the like.

Figure 8:
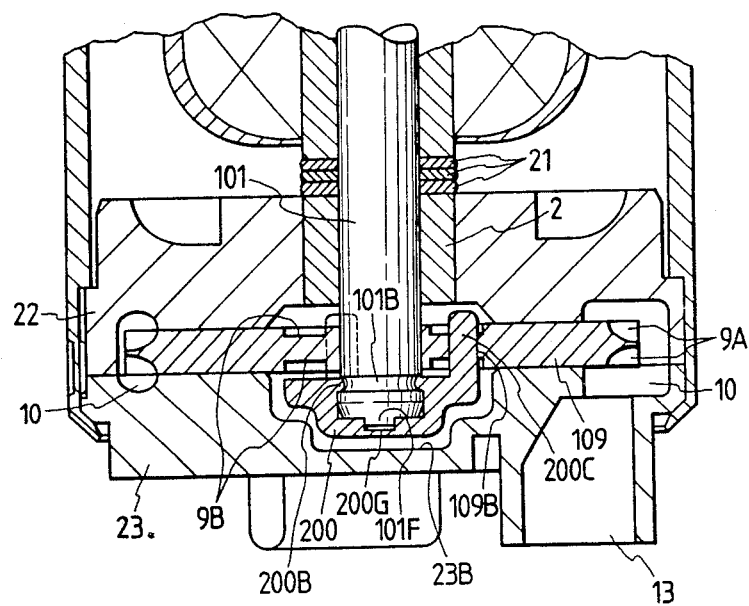
FIG. 8 is an enlarged vertical sectional view showing an example of the impeller and the vicinity thereof similar to FIG. 1 but with certain parts reversed.

FIG. 8 is the same as FIG. 1 of the drawings except that the positions of the first and second engaging portions are reversed, i.e., element 101F in FIG. 8 is a projection formed on the end surface of the main shaft 101, and groove 200G is defined on coupler 200.

Advantages of the Invention

As is apparent from the above description, the following advantages are obtained in accordance with the present invention:

(1) Since the main shaft, impeller and coupler are constructed so as to be symmetrical with respect to the central axis of the armature, there is no case where the armature becomes unbalance. Thus, adjustment in balance of the armature becomes unnecessary or, even if necessary, is easy.

(2) Since a hole (main shaft hole) for inserting the rotation axis of the armature which is defined on the impeller exhibits a circular shape, the hole may be reworked after molding the impeller so that the center of the hole can be accurately coincident with that of the impeller.

Accordingly, there is no fear that the impeller will be eccentrically attached to the main shaft, so that there is no case where pulsation arises in the fuel flow delivered from the fuel pump or it produces noise and/or vibration.

What is claimed is:

1. In a fuel pump of the type comprising a pump casing having a pump chamber therein, an impeller disposed in the pump chamber, a rotatable main shaft one end of which is connected to the center of the impeller to rotate said impeller, and a means for driving the main shaft, the improvement comprising
    a coupler engaging mechanically with both the impeller and the main shaft to prevent rotation of said impeller relative to said main shaft;
    said impeller having a central hole defined at the center thereof for receiving the main shaft, said impeller also having at least one pin hole therein spaced from said central hole;
    a first engaging portion formed on an end surface of the main shaft adjacent the portion of said main shaft which engages said central hole; and
    a pin formed integrally with the coupler and engaging with said pin hole in said impeller, said coupler also having a second engaging portion which engages with said first engaging portion on said main shaft, the cross section of each of said first and second engaging portions being noncircular in a plane perpendicular to said main shaft.

2. A fuel pump as claimed in claim 1 wherein the coupler is constructed in a dish-shape, said second engaging portion being formed on the bottom wall thereof, and said pin being formed on the circumference thereof.

3. A fuel pump as claimed in claim 1 wherein said first engaging portion is a groove defined on the end surface of the main shaft, and said second engaging portion is a projection formed on the bottom wall of the coupler at a position corresponding to that of said first engaging portion.

4. A fuel pump as claimed in claim 1 wherein said first engaging portion is a projection formed on the end surface of the main shaft, and said second engaging portion is a groove defined on the coupler at a position corresponding to that of said first engaging portion.

5. A fuel pump as claimed in claim 1 wherein the respective centers of gravity in the main shaft, impeller, and coupler are positioned on the rotational central axis of said main shaft.

6. A fuel pump as claimed in claim 1 wherein a plurality of said pin holes are defined on the impeller around said central hole, said pin holes being located symmetrically with respect to the center of said impeller.

7. A fuel pump as claimed in claim 1 wherein a third engaging portion is formed on the circumference of said main shaft in the vicinity of said end surface of the main shaft, and a fourth engaging portion which engages with said third engaging portion is formed on the inner wall of said coupler.

* * * * *